(12) United States Patent
Krishnan et al.

(10) Patent No.: US 12,499,018 B2
(45) Date of Patent: Dec. 16, 2025

(54) ANTI-ENTROPY IN ENTERPRISE NETWORKS

(71) Applicant: SAP SE, Walldorf (DE)

(72) Inventors: Kavitha Krishnan, Bangalore (IN); Debashis Banerjee, Bengaluru (IN)

(73) Assignee: SAP SE, Walldorf (DE)

( * ) Notice: Subject to any disclaimer, the term of this patent is extended or adjusted under 35 U.S.C. 154(b) by 509 days.

(21) Appl. No.: 18/159,753

(22) Filed: Jan. 26, 2023

(65) Prior Publication Data

US 2024/0256403 A1 Aug. 1, 2024

(51) Int. Cl.
*G06F 11/16* (2006.01)
*G06F 11/30* (2006.01)
*G06F 11/34* (2006.01)

(52) U.S. Cl.
CPC ...... *G06F 11/1629* (2013.01); *G06F 11/3089* (2013.01); *G06F 11/3409* (2013.01)

(58) Field of Classification Search
None
See application file for complete search history.

(56) References Cited

U.S. PATENT DOCUMENTS

| | | | |
|---|---|---|---|
| 2019/0007432 A1* | 1/2019 | Tauschinsky | G06F 17/18 |
| 2022/0351744 A1* | 11/2022 | Krishnan | G06N 3/045 |
| 2024/0371360 A1* | 11/2024 | Zhang | G06N 20/00 |

* cited by examiner

*Primary Examiner* — June Sison
(74) *Attorney, Agent, or Firm* — Buckley, Maschoff & Talwalkar LLC

(57) ABSTRACT

A system and method are provided including a plurality of nodes including at least one neighbor node set formed from at least a first node and a second node, wherein each node of the plurality of nodes converts at least one input to at least one output; a processing unit executes processor-executable program code to cause the system to: execute the first node, wherein execution of the first node generates an execution status for the first node and output data for the first node; receive, by the second node, at least the execution status for the first node and output data for the first node; compare, by the second node, the received execution data to an anomaly policy; detect, by the second node, an anomaly at the first node based on the comparison; and transmit the detected anomaly to at least an anomaly learning module. Numerous other aspects are provided.

20 Claims, 9 Drawing Sheets

ANTI-ENTROPY IN ENTERPRISE NETWORKS

BACKGROUND

An enterprise may include one or more physical systems (e.g., machines, machine sub-component(s), plants, etc. associated with power turbines, jet engines, locomotives, autonomous vehicles, medical equipment, etc.) operated by a control system. The control system may monitor the physical system using one or more monitors. The monitors may be used to detect anomalies in execution of the physical system so that preventative maintenance may be scheduled. The monitors may refer to, for example, sensors and actuators that may send their monitored values periodically to cloud-based software, for example. The cloud-based software may receive the sensor and actuator data and detect anomalies of different physical systems individually based on a comparison, by a central algorithm of the cloud, to expected data values for that physical system. For example, a machine performs a task, and while the machine is performing the task, the monitors (e.g., sensors and actuators) are periodically sending data (e.g., a temperature of the machine) during the performance to the cloud-based software. The central algorithm receives the monitored data as input and detects whether the input data indicates an anomaly for the physical system. In the non-exhaustive example of temperature, the machine is operating normally when the temperature is between 50-55 degrees Celsius, and is abnormal/anomalous when operating outside that range. The central algorithm periodically receives temperature data for the physical system and determines whether this temperature is within the normal range; and if it is not within the normal range, an anomaly is detected. Conventionally, the monitors are associated with an individual physical system and the physical system is checked individually by the central algorithm to detect any anomalies. The central algorithm may report data for that individual physical system, and the report may in some instances, be after completion of the task. In those instances, the anomaly may not be detected until completion of the task. For example, a physical system may include an assembly line of two grinding machines to produce ground coffee. The monitor may monitor the physical system by measuring a weighted output of ground coffee. In this case, based on the input to the physical system, 100 kg of ground coffee are expected to be output from the physical system. In a case there is a problem with the first grinder there may be a long delay in identifying the problem as the central algorithm may not detect an anomaly until the task is complete and the weight of the output coffee powder is less than 100 kg. This delay may cause further delays in related aspects of the system as well as delays in addressing the problem that caused the first grinder to malfunction.

Systems and methods are desired which make it easier to monitor physical systems.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
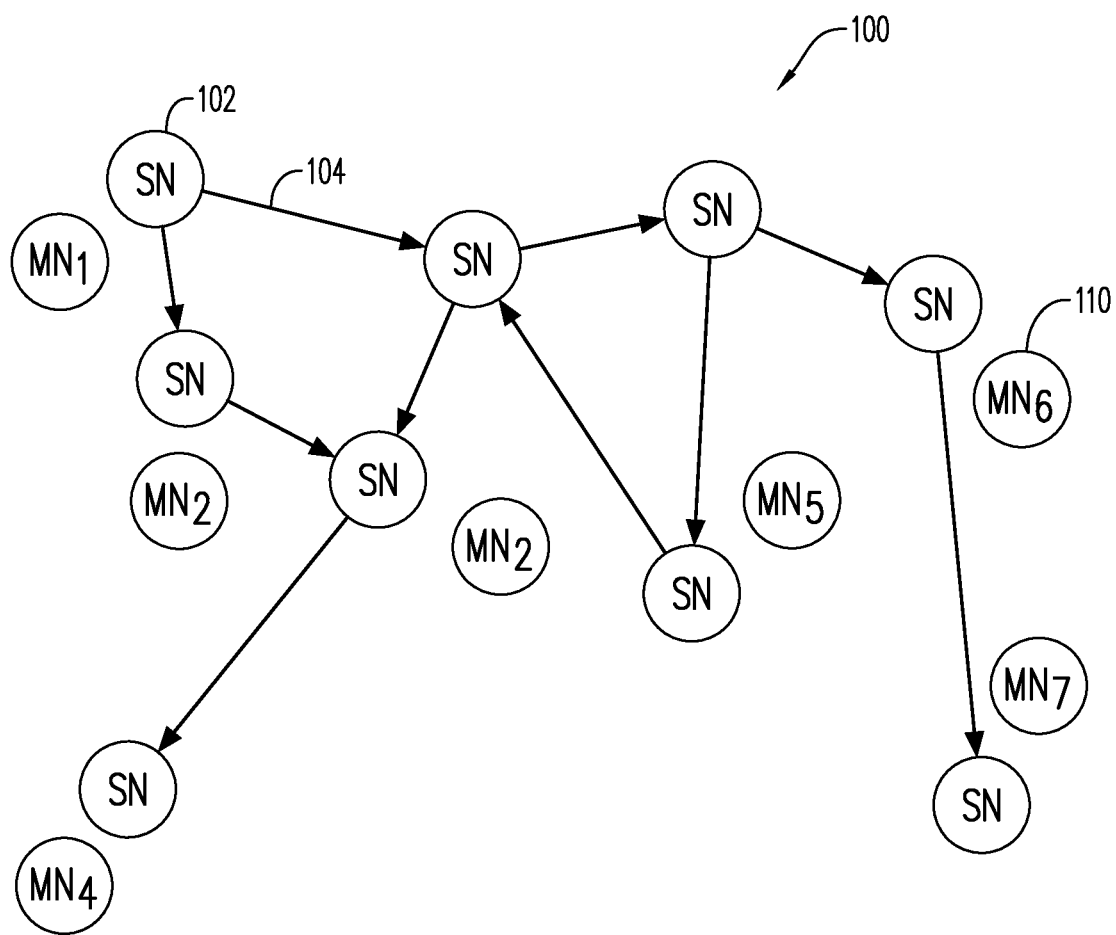
FIG. 1 is a high-level block diagram of a system according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Embodiments provide for nodes in an organization to be monitored by neighboring nodes with respect to an expected performance of that node. The knowledge used to monitor the node may be with respect to equipment type by policy, behavior and a comparison to industry benchmarks, for example. The neighbor node(s) may gain this knowledge through Distributed learning (e.g., machine learning that uses centralized data but distributes the model training to different nodes) and/or Federated learning (machine learning that uses decentralized data and training, but effectively has a central model—it enables participants to train local models cooperatively on local data without disclosing sensitive data to a central cloud server). In embodiments, the data may be processed at the node itself. Pursuant to some embodiments, instead of detecting anomalies through a central algorithm in the cloud for a specific node (e.g., node of interest) as with conventional anomaly detection, embodiments provide for the neighbor node detecting anomalies in specific nodes and reporting the same. In this case, the processing is happening as a decentralized method and the neighbor node reports when the node of interest is having trouble. The benefit of this is that both the node itself (which monitors itself) and at least one neighbor may send an alert in case of anomalous data, so that the neighbor nodes in the community help to detect an anomaly in the node.

FIG. 1 is a high-level block diagram of a system 100 that may be provided in accordance with some embodiments. The system 100, such as an industrial asset associated with power generation, an electric grid, jet plane, a data center, etc. is made up of interconnected system nodes 102 ("SN" in FIG. 1) which may be associated with sensors, actuators, data paths, sub-components of the system, etc. The system nodes 102 may represent an entity, including but not limited to, a machine, a subcomponent of a machine, a plant, etc. Each node may represent an entity of a particular type (e.g., coffee bean sorter, course grinder, fine grinder, etc.). The system 100 may include nodes of different types and may include one or more nodes of a same type. Two nodes may be connected to each other by an edge 104. The edges 104 may represent the relationship between the two nodes. The edges 104 may be thought of as a collection of a pair of nodes, where the two members of the pair are the nodes involved in the focal relationship. The edges 104 may allow data to flow between the nodes, and may convey information about the interactions or links between the nodes.

In one or more embodiments, the nodes 102 may be created during onboarding of the node to the software system. As used herein "node onboarding" may describe the initial process of installing and configuring the required software on the nodes as well as linking the node to a cloud-based architecture, or on-premise software architecture. The edges may in embodiments, be created when the nodes begin interacting (e.g., transmitting data) with each other, such that the connection/edge may be built over time based on how each node is interacting. As described further below, and according to embodiments, the nodes for an organization may learn the performance of other nodes in that organization. The nodes may learn the performance in general for that node type (e.g., equipment type) by policy, behavior and other features (e.g., a comparison with industry benchmarks for that node type).

Some nodes 102 are associated with a monitoring node (MN) 110 that generates a series of current monitoring node values over time that represent a current operation of a physical system (e.g., a machine for manufacturing ground coffee). Note that a monitoring node 110 may be physically located such that it is not associated with any system node 102 or may be associated with multiple system nodes 102. A single system node 102 may be associated with more than one monitoring node 110. The system 100 may create and/or include decision boundaries/thresholds that may be used to classify operation of the system node 102 as "normal" or "anomalous."

Together the edges and nodes may form a knowledge network, which is a collection of relationships among entities having a common concern (e.g., performance as part of the system) and share/transfer data. The nodes and edges may also be represented in the form of graphs of entities that include automated processes, and behavioral and interactional information capture and dissemination. The graphs may be at least one of a network graph of a factory, a network graph of similar machines, and a network graph of many manufacturing units. As a non-exhaustive example, consider FIG. 2, which includes three companies (Company A, Company B and Company C) and two plants of Company A and two or more plants of Company B and one plant for Company C. Each of circles 202 for Company A, Plant 1, circle 204 for Company A, Plant 2 and 206 for Company B, Plant X may be a network graph of a factory/plant, including several different types of nodes (denoted by different sized circles) that may be connected by edges. The circle 208 for Company B, Plant 1 may be a network graph of similar machines denoted by circles of approximately the same size. The circle 210 for Company C, Plant 1 may be a network graph of many manufacturing units.

Figure 2:
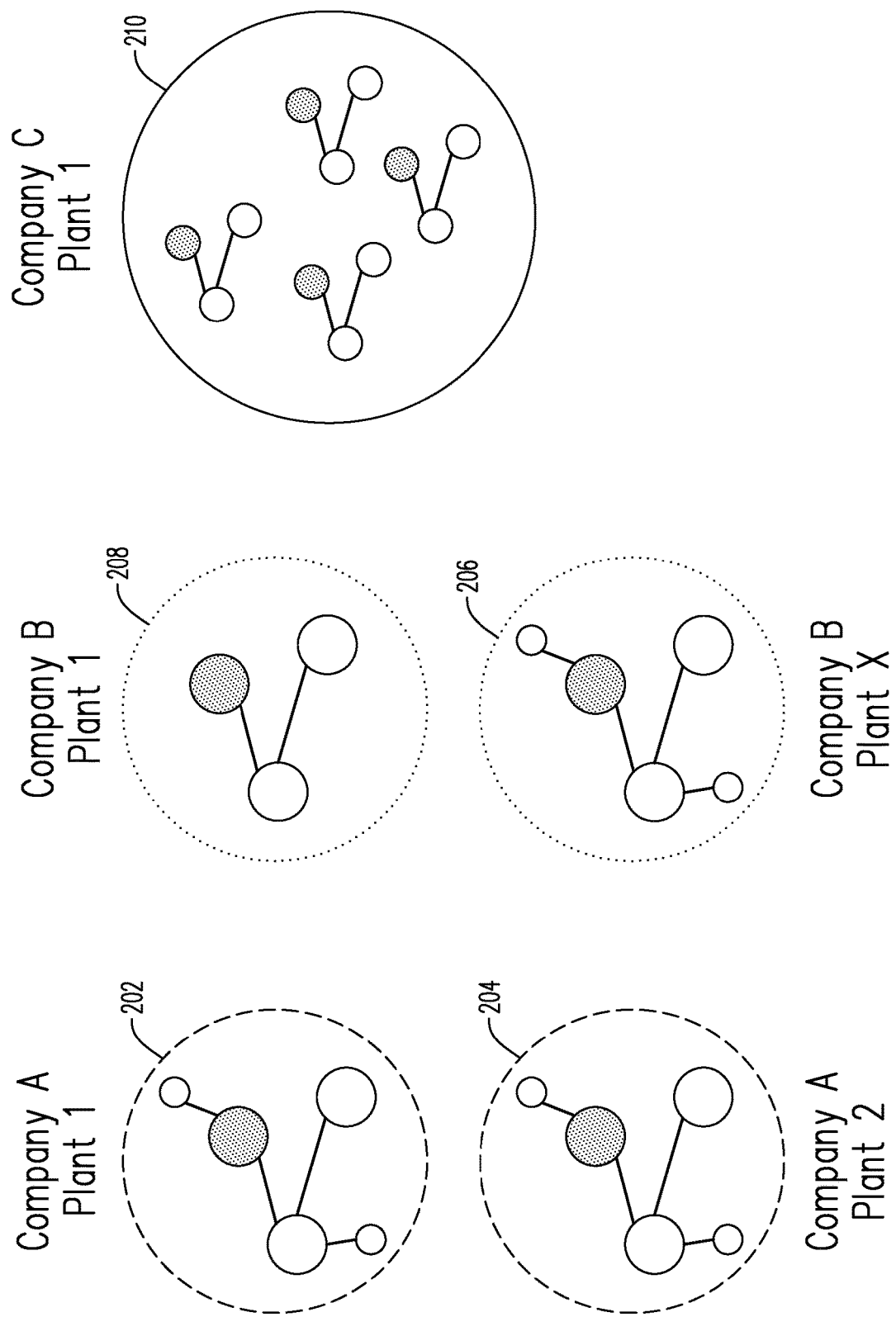
FIG. 2 is a block diagram of a non-exhaustive example of a plurality of machines according to some embodiments.

Continuing with the example in FIG. 2, the black-filled circles represent the nodes of interest which may be monitored by the neighbor nodes (white-filled circles). The black-filled nodes may be of a similar type, while the white-filled circles may be a same type as the black-filled nodes or a different type. It is also noted that in addition to being a different type than the black-filled nodes, the white-filled nodes may also be a different type from each other. To detect an anomaly in Plant 1 of Company A, at least some of the white-filled nodes may monitor the performance of the black-filled node in plant 1 of Company A. It is noted that while some of the white-filled nodes may also be in Plant 1 of Company A, they may not monitor the black-filled node, as they are not part of a neighbor set with the black-filled node, as described further below. The white-filled nodes in Plant 1 of Company A may learn the expected policy and behavior performance for the black-filled node in Plant 1 of Company A based on at least one of an industry benchmark, prior behavior of the black-filled node in Plant 1 of Company A, prior behavior of other black-filled nodes in Company A and/or Company B and Company C. It is noted that with respect to the behavior of other black-filled nodes in Company B and Company C, these nodes may be external to the plurality of nodes in Company A, and the anomaly information for these companies may be received by a cloud-based learning module, described further below, that may use the collected data to define and update anomaly policies.

Figure 3:
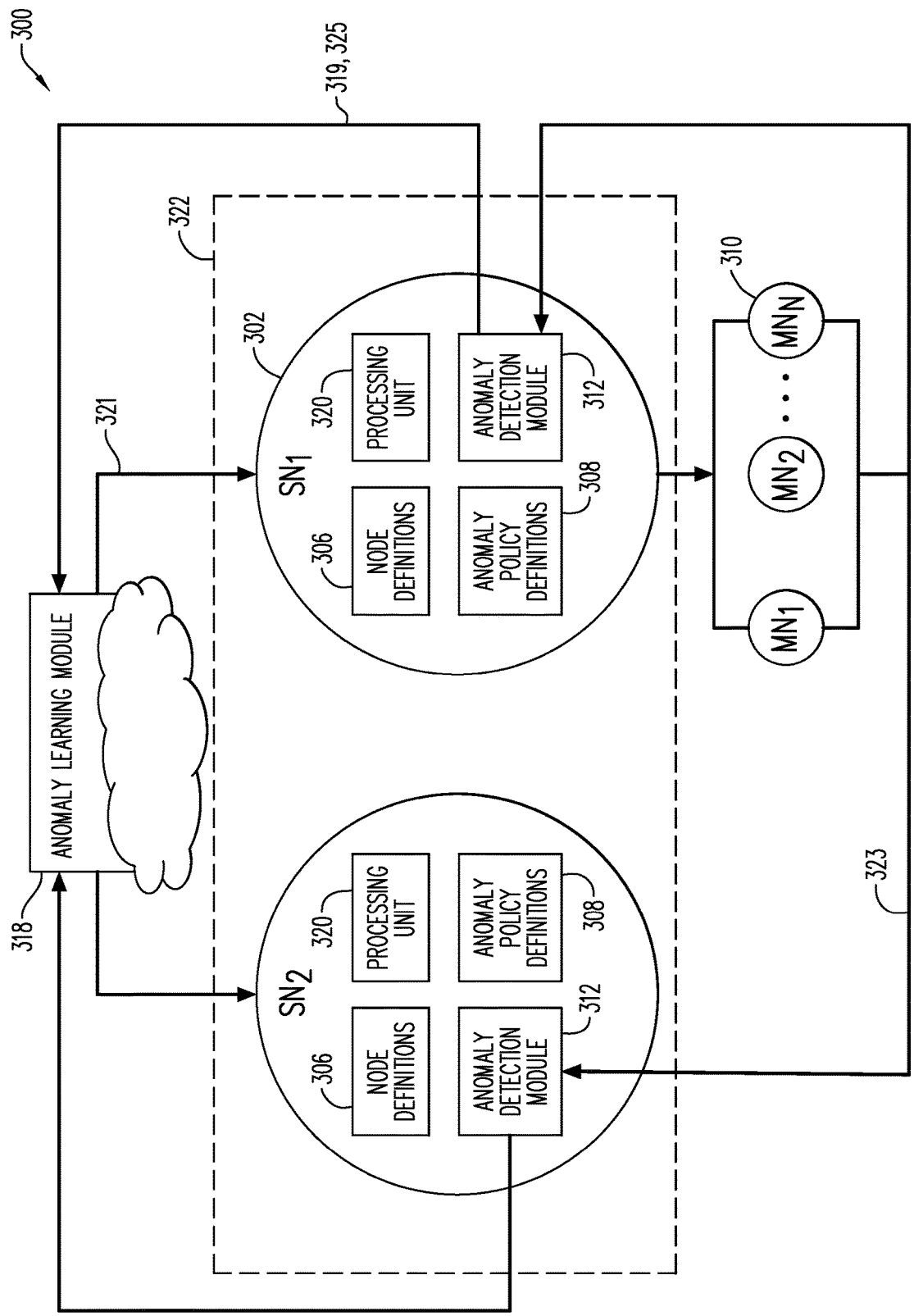
FIG. 3 is a block diagram of an architecture according to some embodiments.

FIG. 3 is a high-level architecture of an anomaly detection system 300 in accordance with some embodiments. The system 300 may utilize a decentralized method to detect anomalies in a given node (e.g., machines) according to some embodiments. The illustrated elements of the system 300 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 300 are implemented by a single computing device, and/or two or more elements of architecture 300 are co-located. One or more elements of architecture 300 may be implemented using cloud-based resources, and/or other systems which apportion computing resources elastically according to demand, need, price, and/or any other metric.

The system 300 may include a plurality of system nodes 302, which may represent machines, for example, and monitoring nodes 310 as described above with respect to FIG. 1. Each node of the plurality of nodes converts at least one input to at least one output. In particular, the system node 302 may provide information to a control system (not shown) at the monitoring node. The control system may include sensors which may help controllers with electronics and processors adjust actuators. In some embodiments, the monitoring node may only include sensors. Information from the monitoring nodes 310 may be provided to an anomaly detection module 312 at each system node 302. Pursuant to some embodiments, the anomaly detection module 312 may poll the monitoring nodes one of continually and periodically for data to determine whether any of the data received as part of the polling is anomalous (e.g., exceeds/violates an anomaly policy). The anomaly detection module 312 may also receive, for each system node 302, a node definition 306 and one or more anomaly policy definitions 308. Each system node 302 may have at least one anomaly policy definition 308 for itself so that the system node may monitor its own performance. In a case the node definition 306 includes a neighbor node for the instant node, the instant node may also include at least one anomaly policy definition 308 for the neighbor node too. The node definition 306 and the anomaly policy definition 308 may be received by the system 300 when onboarding the system node 302. The node definition 306 and the anomaly policy definition 308 may be stored in a database, or any suitable storage.

Figure 4:
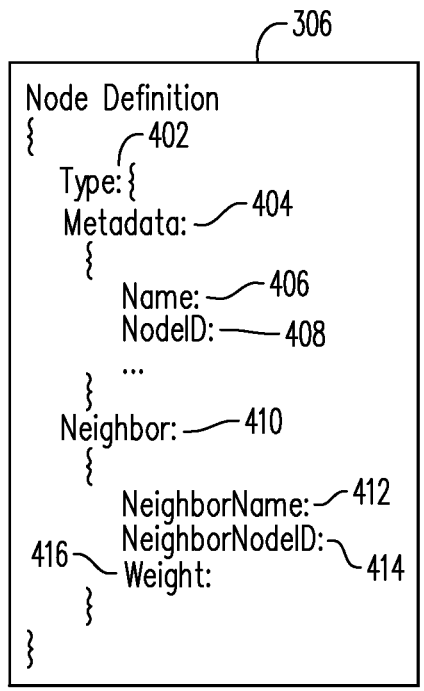
FIG. 4 is a node definition according to some embodiments.

The node definition 306 (FIG. 4) may include a node type 402 indicating the category of node, which may be specific for the type of system. Continuing with the non-exhaustive ground coffee bean example, the category may be bean grinder or course grinder. The node definition 306 may also include metadata 404 describing a node name 406 and a node ID 408. The node name 406 and node ID 408 may be used to identify the node to its neighbors. Other suitable metadata 404 may be included in the node definition 306. Pursuant to embodiments, the node definition 306 may also include information about one or more neighbor nodes 410 that may monitor the instant node (the node for which the definition is generated). Each neighbor node 410 may include a neighbor name 412, a neighbor node ID 414 and a weight 416. The neighbor name 412 and neighbor node ID 414 may be used to identify the neighbor node to the instant node. The weight 416 may be used to represent the relative importance of the anomaly policies being monitored by the neighbor node for the instant node.

In embodiments, the anomaly policy for the neighbor node may include a plurality of weights, with each weight applied to a different monitored parameter. Continuing with the non-exhaustive ground coffee bean example, the neighbor node may monitor both temperature and pressure for the instant node coarse grinder. When the instant node is onboarded, the pressure parameter for the instant node may be selected as having a higher weight than the temperature parameter for the instant node, indicating to the neighbor node that violating (e.g., exceeding) the pressure anomaly policy value indicates an anomaly, while violation of the temperature anomaly policy value may not indicate an anomaly. In some embodiments, there may be additional rules associated with the weights to indicate circumstances for detecting an anomaly. As will be described further below, different organizations may place different weights on the same policy parameter. For example, organization A may find temperature is more important than pressure in producing their ground coffee and place a higher weight on temperature, while organization B may find that pressure is more important than temperature in producing their ground coffee and place a higher weight on pressure.

Figure 5:
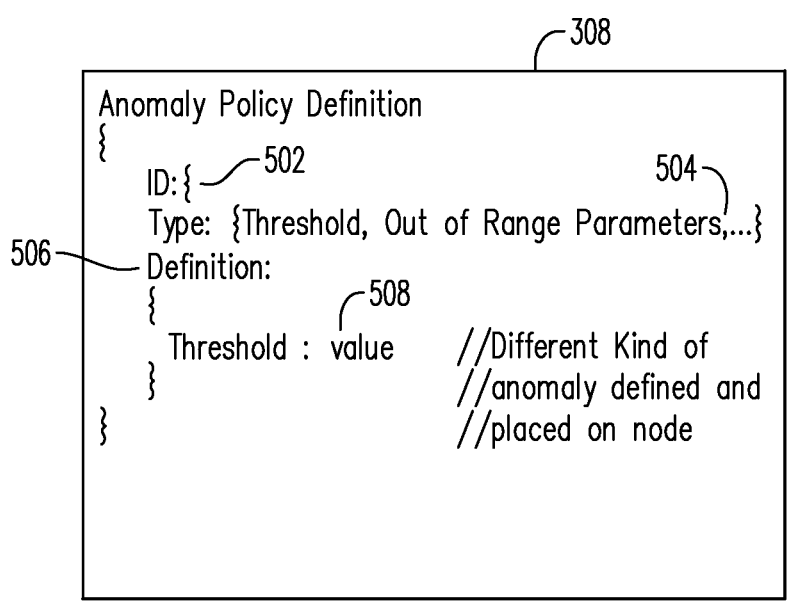
FIG. 5 is an anomaly policy definition according to some embodiments.

The anomaly policy definition 308 (FIG. 5) may include an ID 502, a type 504, and the bounds of the definition ("definition") 506. The ID 502 may indicate the node for which this definition is applicable. The type 504 may indicate the type of anomaly policy used to indicate detection of an anomaly. As a non-exhaustive example, the anomaly policy may be a threshold, decision boundary, out of range parameters, etc. While the examples described herein will be with respect to a threshold anomaly policy type, any suitable anomaly policy may be used. The definition 506 indicates the selected type and the value 508 for that type. As a non-exhaustive example, the temperature threshold may be 50 degrees Celsius. It is noted that there may be multiple anomaly policy definitions for a same node, as different parameters may be monitored for the node, with each having different kinds of anomaly policies placed on the nodes. As described in the non-exhaustive example above, the monitored parameters for manufacture of the ground coffee may be temperature and pressure, and each parameter may have a different anomaly policy associated therewith.

Initially the threshold for a node may be based on benchmarks provided by the node manufacturer for one or more input metrics for the node. Pursuant to some embodiments, over time, the metrics and performance Key Performance Indicator values of similar nodes in the network may be measured to obtain actual values, which may be used to train a machine learning model of the anomaly learning module (e.g., metrics as input and performance KPIs as output) and used by the anomaly detection module 312 to detect an anomaly, as described further below with respect to FIG. 6. In response to the training, the anomaly policy (benchmarks/decision boundaries/thresholds) may be updated based on the node performance, which may be more accurate in terms of detecting an anomaly. Additionally, in some embodiments, the system may use data envelopment analysis (DEA) to find a correlation between the input metrics and the performance KPIs to generate the new/updated anomaly policies (benchmarks/decision boundaries/thresholds) based on in-field actual node performance, described further below with respect to FIGS. 7A and 7B.

The node definition 306 and anomaly policy definition 308 may be used with the anomaly policy, described further below with respect to FIGS. 7A and 7B, in execution of an anomaly detection module 312. The anomaly detection module 312 may be a policy engine adapted to detect via a machine learning model when a node has violated an anomaly policy per the anomaly policy definition. The anomaly detection module 312 may poll the node (and/or neighbor node) one of continually and periodically for data from the monitors and, using a machine learning model, determine whether any of the data received as part of the polling exceeds/violates the anomaly policy. The anomaly detection module 312 may for example, monitor streams of data from the monitoring nodes 310 comprising data from sensor nodes, actuator nodes, and/or any other critical monitoring nodes (e.g., sensor nodes $MN_1$ through $MN_N$) and automatically output an anomaly status signal 319 (i.e., anomaly or no anomaly) to the anomaly learning module 318. According to some embodiments, information about detected anomalies may be transmitted back to the nodes for further transmission to an operator. Based on the detected anomalies, the anomaly learning module 318 may update the anomaly policy definition(s) (e.g., change the decision boundary value 508) and send this updated information 321 back to the nodes 302.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 6:
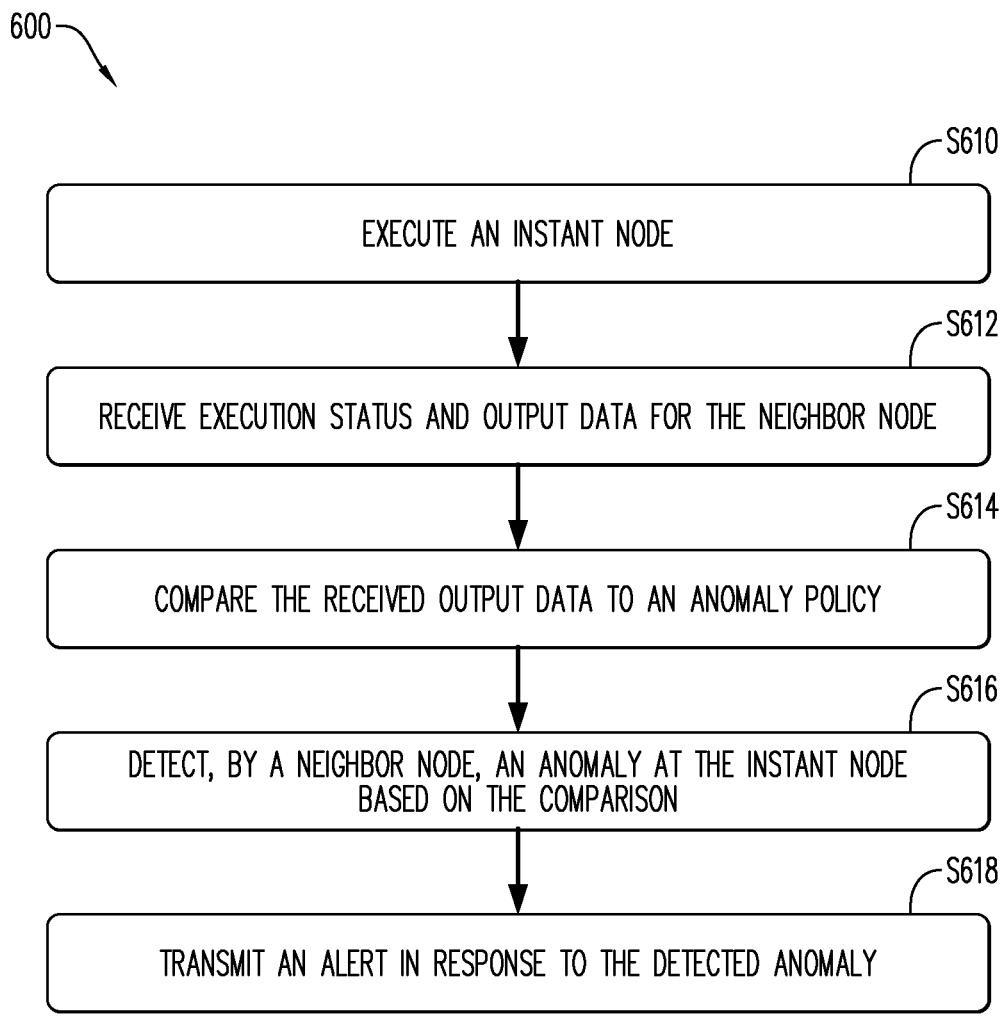
FIG. 6 is a flow diagram of a process according to some embodiments.

FIG. 6 illustrates a method 600 of detecting an anomaly, in accordance with an example embodiment. For example, the method 600 may be performed by a database node, a cloud platform, a server, a computing system (node/user device), a combination of devices/nodes, or the like, according to some embodiments. In one or more embodiments, the computing system 300 may be conditioned to perform the process 600, such that a processing unit 320 (FIG. 3) of the system 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to execution of the process 600, the instant node may be onboarded to the system 300, and a node definition 306 and an anomaly policy definition 308 for the instant node may be received. As described above, the node definition 306 may include a neighbor node 410 that may monitor the instant node. The instant node may monitor itself via its own anomaly policy definition and may also be monitored by the defined neighbor node 410 via the anomaly policy definition 308. The instant node and the neighbor node 410 together may be included in a neighbor set 322. The neighbor set 322 may include at least two nodes, where at least one of the nodes observes and/or monitor the performance of another node. The instant node in the neighbor set may detect an anomaly in itself and the neighbor node in the neighbor set may also detect an anomaly in the instant node. Upon detection of an anomaly, at least one of the instant node and the neighbor node may inform other nodes in the neighbor set 322 and the cloud-based anomaly learning module 318 of the anomaly.

With respect to the following description of the process 600, the instant node may be referred to as the "first node" and the neighbor node may be referred to as the "second node".

Initially, at S610 the instant node ($SN_1$) 302 is executed. Execution of the instant node may include execution of any suitable function or job by the instant node. Execution of the instant node may output data received by one or more monitoring nodes 310. The output data may include values for one or more parameters monitored by the one or more monitoring nodes. In some embodiments, execution of the instant node may also output an execution status (e.g., "complete" or "incomplete"). Then, in S612, at least the execution status for the instant node and output data 323 for the instant node are received at both the anomaly detection module of the instant node and the anomaly detection module of the neighbor node identified in the node definition for the instant node. It is noted that the execution status and the output data may be received by the anomaly detection module 312 at the instant node and the neighbor node at a same time, approximately a same time, or different times. The anomaly detection module 312 at each of the instant node and the neighbor node compares the output data 323 for a given parameter to the anomaly policy value for the instant node for that parameter in S614. In a case the output data 323 has values that do not exceed the anomaly policy values, the output data 323 is normal and no anomaly is detected. In a case the output data violates/exceeds the anomaly policy values, the output data is abnormal and an anomaly is detected in S616. Next, in S618, in the case the anomaly is detected, anomaly data 325 including the anomaly status signal 319 is transmitted to the anomaly learning module 318. The anomaly data 325 may also include the output data value that exceeded the anomaly policy value and the associated metric.

Figure 7A:
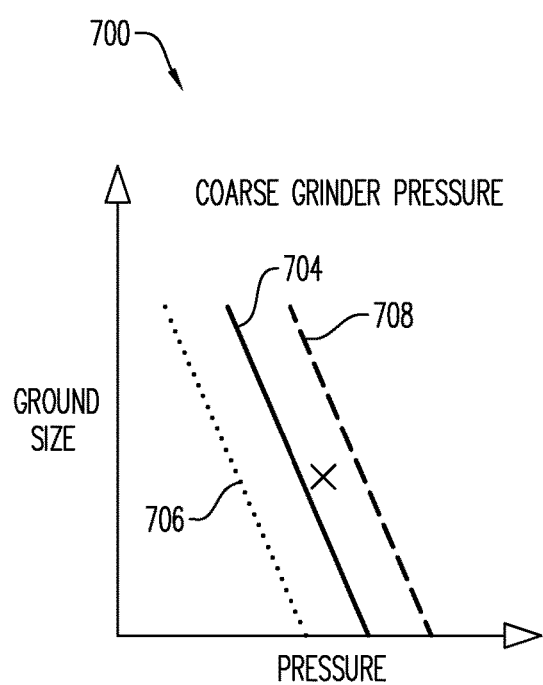
FIGS. 7A and 7B are graphs illustrating anomaly policies according to some embodiments.

FIG. 7A illustrates a decision boundary anomaly policy type for the pressure monitoring node parameter in the non-exhaustive ground coffee example, in accordance with some embodiments. In particular, for the parameter, a graph 700 includes a first axis representing a first weighted parameter (e.g., pressure) and a second weighted parameters used to characterize the data (e.g., ground size). The instant graph indicates that as the pressure increases, the ground size may decrease. The system may use Data Envelopment Analysis (DEA) to find the correlation between the metric (e.g., input/pressure) and the performance KPI (e.g., output/ground size). Based on DEA, the system may define an operational excellence frontier/best practice frontier, that indicates which nodes are performing the best (e.g., ones with minimum input performing high/as the input is increasing the output is increasing), which may help define the anomaly policy value including decision boundaries and thresholds, etc. The graph 700 may include a hard boundary 704 (solid line), an inner boundary (dotted line) 706, an outer boundary 708 (dashed line) and an indication associated with current feature location for the monitoring node parameter value (illustrated with an "X"). As illustrated herein, the current monitoring node parameter value location is between the minimum and maximum boundaries (that is, the "X" is between the dotted and dashed lines). As a result, the anomaly detection module 312 may determine that the operation of the coarse coffee grinder is normal and no anomalies are detected.

Figure 7B:
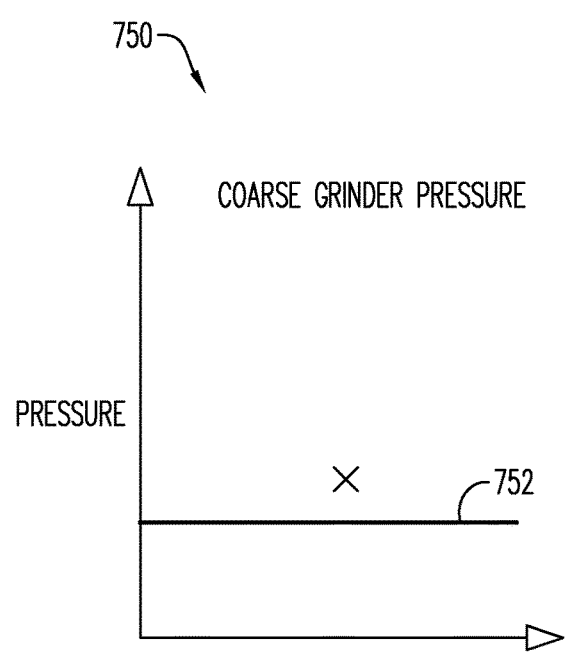

FIG. 7B illustrates a threshold anomaly policy type for the pressure monitoring node parameter in the non-exhaustive ground coffee example, in accordance with some embodiments. In particular, for the parameter, a graph 750 includes a first axis representing a first weighted parameter (e.g., pressure). The graph 750 may include a threshold 752 (solid line) and an indication associated with current feature location for the monitoring node parameter value (illustrated with an "X"). As illustrated herein, the current monitoring node value location is beyond the threshold 752 (that is, the "X" is above the solid line). As a result, the anomaly detection module 312 may detect an anomaly and determine that the operation of the coarse coffee grinder is abnormal.

Figure 8A:
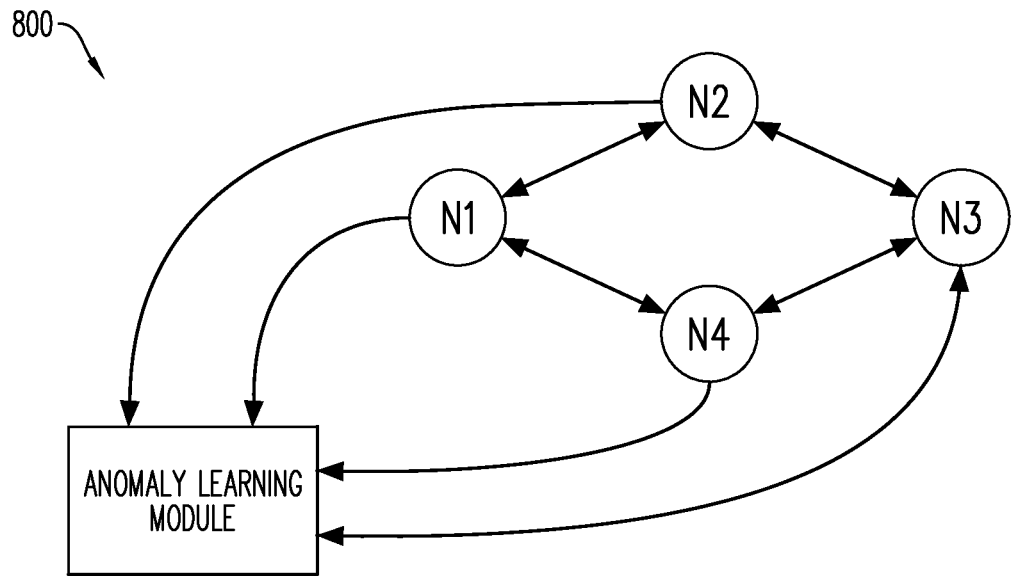
FIG. 8A is a diagram illustrating non-exhaustive example of a first use case according to some embodiments.
Figure 8B:
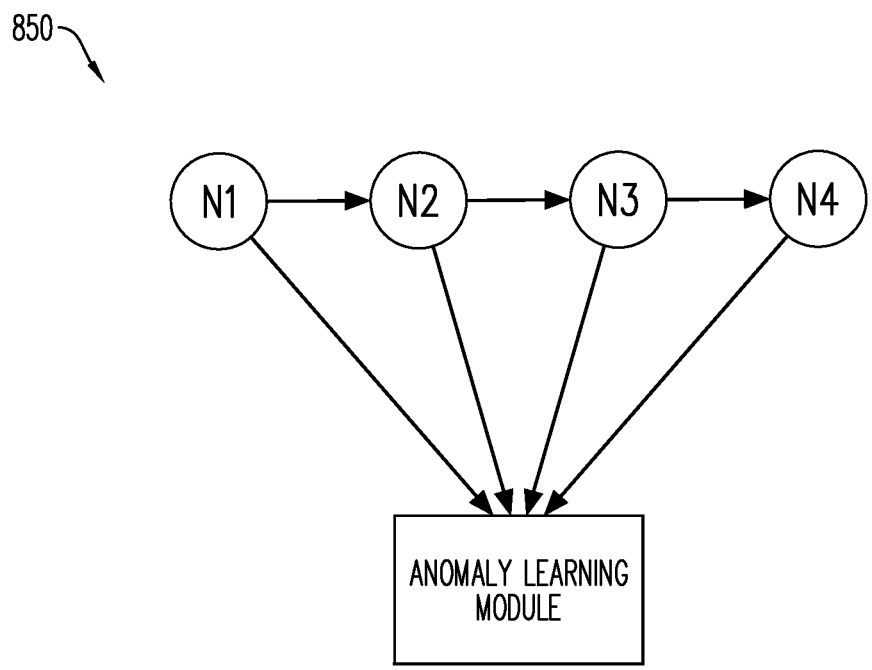
FIG. 8B is a diagram illustrating non-exhaustive example of a second use case according to some embodiments.

Turning to FIGS. 8A and 8B, respectively, the following will describe two use cases.

In the first use case 800 (FIG. 8A), the Nodes (N1, N2, N3, N4) are a same type of machine. Since all of the nodes are a same type of machine, they should have a same way output for a same input. Continuing with the ground coffee example, all of the nodes represent coarse coffee grinders. In this example, all of the nodes are included in the neighbor set, and each node is monitoring two of the other three nodes during execution of the nodes. For example, N1 monitors itself, N2 and N4; N2 monitors itself, N1 and N3; N3 monitors itself, N2 and N4; and N4 monitors itself, N3 and N1. When the anomaly detection module determines monitored data for any of the nodes (N3 in this non-exhaustive example) is different from the expected data (e.g., violates the anomaly policy definition), the node that violates the anomaly policy sends an anomaly data 325 to the anomaly learning module 318. For example, an input of coffee beans to the coarse grinder should yield an output having ground coffee with a particle size of 0.75 mm. However, N3 outputs ground coffee with a particle size of 1.5 mm, indicating an anomaly. As described above, the anomaly data 325 may include the inputs to the node and output from that node that caused detection of the anomaly. Additionally, the other nodes in the neighbor set (e.g., N2 and N4 when N3 in this example) may also detect, via their respective anomaly detection modules, that the data for N3 is anomalous, and these other nodes may also send anomaly data 325 to the anomaly learning module 318, the anomaly data 325 from the other nodes including the output from the node that caused the anomaly.

In the second use case 850 (FIG. 8B), the Nodes (N1, N2, N3, N4) may be different types of machines. While they may be arranged in an assembly-line-type fashion in FIG. 8B, in other instances, they may also be arranged in other suitable configurations. Continuing with the ground coffee example, N1 may be a bean counter, N2 may be a bean washer using a particular pressure and temperature to clean the beans, N3 may be a coarse grinder outputting coffee grinds having an expected particle size of 0.75 mm and N4 is a fine grinder outputting coffee grinds having an expected particle size of 0.3 mm. Like the first use case, N1, N2 and N3 may each monitor themselves and another node. In this case, N1 also monitors N2 and N2 also monitors N3. Unlike the first use case, because these nodes are in an assembly line, in addition to detecting an anomaly based on the monitored data, these nodes may also detect an anomaly when they do not receive the expected output from the preceding node. In some embodiments, this anomaly detection based on a missing input may occur before the analysis of the monitored data is complete. As with the first use case, once the anomaly is detected—via an unexpected input (e.g., missing input or incorrect input) or via analysis of the monitored data—anomaly data is sent to the anomaly learning module 318. For example, since N3 follows N2, in a case N3 does not receive the beans in an expected time, N3 may detect an anomaly in N2 an send anomaly data to the anomaly learning module 318. This may be an anomaly policy N3 has for itself.

Based on these inputs to the anomaly learning module 318, the anomaly learning module, which may include any suitable machine learning algorithm, may update the anomaly policies. Additionally, in some embodiments, in response to receipt of the anomaly data, the anomaly learning module may recommend a corrective action and may recommend updating the anomaly policy definition for each node of that type. It is noted that since the system uses federated learning, and the anomaly learning module is cloud-based, the anomaly learning module may receive anomaly data from multiple nodes in multiple organizations and may use this anomaly data to update the anomaly policies without sharing any organizational data with the other organizations.

Figure 9:
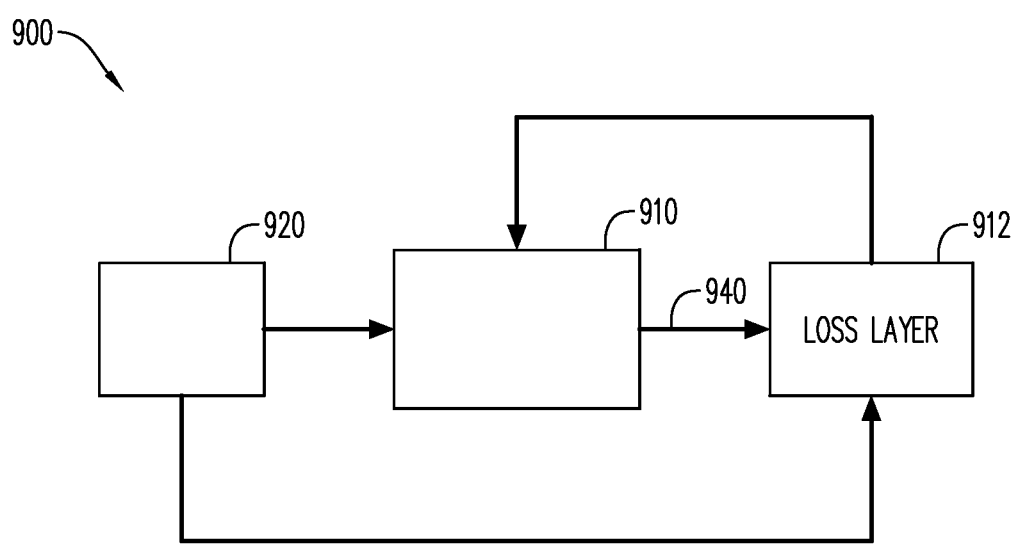
FIG. 9 illustrates training of a machine learning model according to some embodiments.

FIG. 9 illustrates a system 900 for training the Machine Learning (ML) model 910, to detect an anomaly according to some embodiments. The training is based on the data input and output by the monitoring nodes and DEA. Model 910, and all other machine learning models described herein, may comprise a network of neurons (e.g., a neural network) which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data.

Embodiments may comprise any one or more types of models that are or become known, including but not limited to convolutional neural network models, recurrent neural network models, long short-term memory network models, deep reservoir computing and deep echo state network models, deep belief network models, and deep stacking network models. Use of a multilayer model allows for complex non-linear relationships between input parameters and output probabilities.

As is known in the art, the structure of model 910 is defined by hyperparameters and initial node weights. The hyperparameters and initial node weights are designed to receive a numerical representation of values for various parameters, and output a probability that the node is performing unexpectedly (anomaly). As shown in FIG. 9, model 910 is trained based on data 920. Data 920 may consist of detected input parameter values for metrics, and performance KPIs and detected anomalies. The detected anomalies may be considered "ground truth" data corresponding to a respective one of the input values/performance KPIs.

Training of model 910 may consist of inputting data 920 to model 910, and operating model 910 to generate, for each input, prediction of an anomaly 940. Loss layer 912 determines a total loss based on a difference between the predictions 940 and actual detected anomalies in the data 920. The total loss is back-propagated to model 910 in order to modify parameters of model 910 (e.g., using known stochastic gradient descent algorithms) in an attempt to minimize the total loss.

Model 910 is iteratively modified in the above manner, using a new batch of data 920 at each iteration, until the total loss reaches acceptable levels or training otherwise terminates (e.g., due to time constraints or to the loss asymptotically approaching a lower bound). At this point, model 910 is considered trained. Some embodiments may evaluate a performance of model 910 based on testing data (e.g., data 920 which was not used to train model 910) and re-train model 910 differently (e.g., using different initialization, etc.) if the performance is not satisfactory.

As the model 910 is used in the field, the model may be updated with different input values and detected anomalies to update the anomaly policy created via DEA with supervised learning. As data is collected from the nodes, the anomaly learning module 318 may observe, for example, that at least one of the coarse grinders is operating at a different pressure than other grinders. In a case this different pressure does not change the expected output such that it does not violate the anomaly policy, the anomaly learning module 318 may recommend updates to input parameters for other nodes of a same type. In a case this different pressure does change the expected output such that it does violate the anomaly policy, the learning module 318 may receive this data as another training point for the ML model. Pursuant to some embodiments, the anomaly policy may be a default value that may be pre-defined prior to onboarding and/or executing the node on the system. As a non-exhaustive example, there may be a law in place in a first country that a coarse coffee grinder cannot be operated more than 8 hours a day, and a similar law in a second country that the course coffee grinder cannot be operated more than 12 hours a day. As such, the node operating in the first country may have a different anomaly policy definition for an operating time parameter for the coarse grinder node (e.g., Threshold: 8 hours) than the coarse grinder node operating in the second country (e.g., Threshold: 12 hours). In some instances, the default value may be derived/updated over time. The anomaly policy value may be set by a node provider (e.g., the manufacturer of the node). This may be a default value that may change over time based on operation of the node itself and nodes of a similar/same type. The anomaly learning module 318 may enhance or update the anomaly policy definition according to violations and factors that may cause an anomaly.

The anomaly policy may be a boundary that separates the input values into one of an anomaly category or a non-anomaly category. Thus, the anomaly policy that was automatically calculated for the model, using supervised learning, during training, may similarly be updated during field use. According to some embodiments, the anomaly policy might be associated with a line, a hyperplane, a non-linear boundary separating one category from another category, and/or a plurality of decision boundaries. Moreover, an anomaly policy might comprise a multi-class anomaly policy separating multiple categories.

Figure 10:
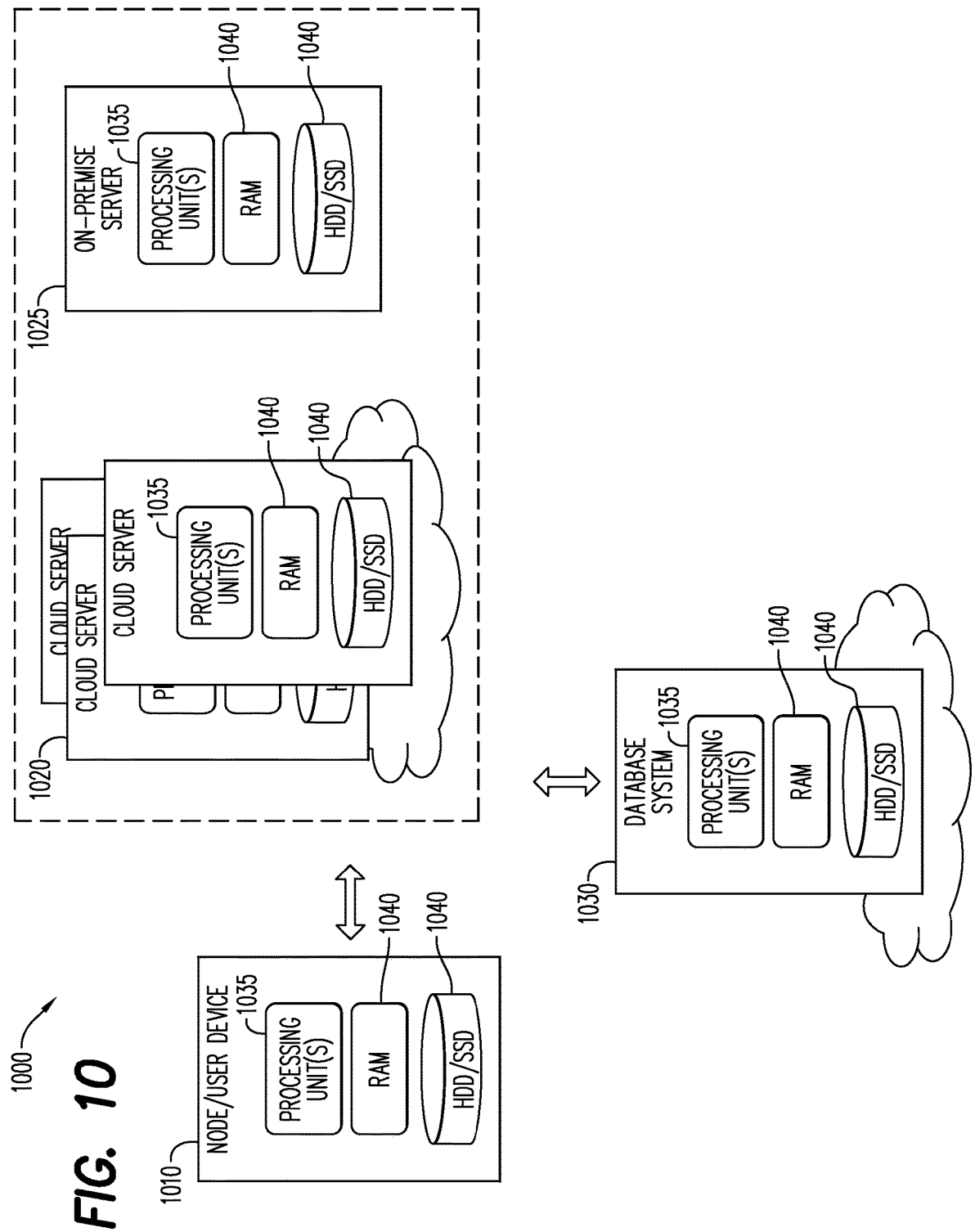
FIG. 10 is a block diagram of a cloud-based database deployment architecture according to some embodiments.

FIG. 10 illustrates a cloud-based database deployment 1000 according to some embodiments. The illustrated components may reside in one or more public clouds providing self-service and immediate provisioning, autoscaling, security, compliance and identity management features.

User device, such as a node, 1010 may interact with applications executing on one of the cloud application server 1020 or the on-premise application server 1025, for example via a Web Browser executing on user device 1010, in order to create, read, update and delete data managed by database system 1030. Database system 1030 may store data as described herein and may execute processes as described herein to cause the execution of the anomaly detection module by the node/user device 1010. Cloud application server 1020 and database system 1030 may comprise cloud-based compute resources, such as virtual machines, allocated by a public cloud provider. As such, cloud application server 1020 and database system 1030 may be subjected to demand-based resource elasticity. Each of the node/user device 1010, cloud server 1020, on-premise application server 1025, and database system 1030 may include a processing unit 1035 that may include one or more processing devices each including one or more processing cores. In some examples, the processing unit 1035 is a multicore processor or a plurality of multicore processors. Also, the processing unit 1035 may be fixed or it may be reconfigurable. The processing unit 1035 may control the components of any of the node/user device 1010, cloud server 1020, on-premise application server 1025, and database system 1030. The storage devices 1040 may not be limited to a particular storage device and may include any known memory device such as RAM, ROM, hard disk, and the like, and may or may not be included within a database system, a cloud environment, a web server or the like. The storage 1040 may store software modules or other instructions/executable code which can be executed by the processing unit 1035 to perform the method shown in FIG. 6. According to various embodiments, the storage device 1040 may include a data store having a plurality of tables, records, partitions and sub-partitions. The storage device 1040 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a plurality of nodes including at least one neighbor node set formed from at least a first node and a second node, wherein each node of the plurality of nodes converts at least one input to at least one output;
   a memory storing processor-executable program code; and a processor to execute the processor-executable program code to cause the system to:
   execute the first node, wherein execution of the first node generates an execution status for the first node and an output data for the first node;
   receive, by the second node, at least the execution status for the first node and the output data for the first node;
   compare, by the second node, the received execution data to an anomaly policy;
   detect, by the second node, an anomaly at the first node based on the comparison; and
   transmit the detected anomaly to at least an anomaly learning module.

2. The system of claim 1, wherein output data is generated by at least one of a sensor node and an actuator node.

3. The system of claim 1, further comprising processor-executable program code to cause the system to:
   compare, by the first node, the received execution data to the anomaly policy; and
   detect, by the first node, the anomaly.

4. The system of claim 1, further comprising processor-executable program code to cause the system to:
   update the anomaly policy based on at least one of the detected anomaly at the first node and a detected anomaly at one or more other nodes.

5. The system of claim 4, wherein the one or more other nodes may be at least one of: 1. nodes included in the plurality of nodes and external to the neighbor set and 2. nodes external to the plurality of nodes.

6. The system of claim 5, wherein the nodes external to the plurality of nodes have a same node type as the second node, and the nodes external to the plurality of nodes transmit anomaly data to a cloud platform accessible by the processor.

7. The system of claim 1, wherein the received output data includes at least one value for a metric correlated with one or more performance Key Performance Indicators (KPI).

8. The system of claim 7, wherein the correlation is based on Data Envelopment Analysis (DEA).

9. The system of claim 1, wherein the second node includes an anomaly detection module adapted to compare the received output data to the anomaly policy.

10. The system of claim 9, wherein the module detects an anomaly with a trained machine learning module.

11. The system of claim 1, wherein each node is associated with a node definition and an anomaly policy definition.

12. The system of claim 11, wherein the node definition for the first node defines the second node as a neighbor node and the neighbor node monitors performance of the first node.

13. A method comprising:
    executing a first node, wherein execution of the first node generates an execution status for the first node and an output data for the first node;
    receiving, by a second node, at least the execution status for the first node and output data for the first node, wherein the first node and the second node are included in a neighbor node set, and both the first node and the second node monitor the first node;
    comparing, by the second node, the received output data to an anomaly policy;
    detecting, by the second node, an anomaly at the first node based on the comparison; and
    transmitting an alert in response to the detected anomaly.

14. The method of claim 13, further comprising:
    comparing, by the first node, the received execution data to the anomaly policy; and
    detecting, by the first node, the anomaly.

15. The method of claim 13, further comprising:
    updating the anomaly policy based on at least one of the detected anomaly at the first node and a detected anomaly at one or more other nodes.

16. The method of claim 15, wherein one or more other nodes may be at least one of: 1. nodes included in a plurality of nodes and external to the neighbor node set, and 2. nodes external to the plurality of nodes.

17. The method of claim 16, wherein the received output data includes at least one value for a metric correlated with one or more performance Key Performance Indicators (KPI).

18. The method of claim 13, wherein each node is associated with a node definition and an anomaly policy definition.

19. A non-transitory, computer readable medium having executable instructions stored therein to perform a method, the method comprising:
    executing a first node, wherein execution of the first node generates an execution status for the first node and an output data for the first node;
    receiving, by a second node, at least the execution status for the first node and output data for the first node, wherein the first node and the second node are included in a neighbor node set, and both the first node and the second node monitor the first node;
    comparing, by the second node, the received output data to an anomaly policy;
    detecting, by the second node, an anomaly at the first node based on the comparison; and
    transmitting an alert in response to the detected anomaly.

20. The medium of claim 19, the method further comprising:
    comparing, by the first node, the received execution data to the anomaly policy; and
    detecting, by the first node, the anomaly.

* * * * *